(12) United States Patent
Chiu et al.

(10) Patent No.: US 10,468,218 B2
(45) Date of Patent: Nov. 5, 2019

(54) RELAY WITH SMA WIRE DRIVEN MECHANISM

(71) Applicant: ISSA Technology CO., LTD., Taoyuan (TW)

(72) Inventors: Chi-Wei Chiu, Taoyuan (TW); Tso-Hsiang Wu, Taoyuan (TW)

(73) Assignee: ISSA Technology CO., LTD., Taoyuan (TW)

( * ) Notice: Subject to any disclaimer, the term of this patent is extended or adjusted under 35 U.S.C. 154(b) by 59 days.

(21) Appl. No.: 15/874,903

(22) Filed: Jan. 19, 2018

(65) Prior Publication Data

US 2019/0228939 A1 Jul. 25, 2019

(51) Int. Cl.
| | |
|---|---|
| *H01H 61/01* | (2006.01) |
| *H01H 37/46* | (2006.01) |
| *H01H 61/06* | (2006.01) |
| *H01H 37/32* | (2006.01) |
| *F03G 7/06* | (2006.01) |
| *H01H 61/013* | (2006.01) |

(52) U.S. Cl.
CPC ...... *H01H 61/0107* (2013.01); *H01H 37/323* (2013.01); *H01H 37/46* (2013.01); *H01H 61/063* (2013.01); *F03G 7/065* (2013.01); *H01H 61/013* (2013.01); *H01H 61/066* (2013.01); *H01H 2061/0115* (2013.01)

(58) Field of Classification Search
CPC ...... F03G 7/065; H01H 37/323; H01H 37/46; H01H 61/0107; H01H 61/013; H01H 61/063; H01H 61/066; H01H 2061/0115; H01H 2061/0122

USPC .......................................................... 337/382
See application file for complete search history.

(56) References Cited

U.S. PATENT DOCUMENTS

| | | | | |
|---|---|---|---|---|
| 5,410,290 | A * | 4/1995 | Cho ............... | H01H 61/0107 337/140 |
| 5,684,448 | A * | 11/1997 | Jacobsen ........ | H01H 61/0107 337/123 |
| 6,016,096 | A * | 1/2000 | Barnes ........... | H01H 61/0107 337/12 |
| 6,239,686 | B1 * | 5/2001 | Eder .............. | H01H 37/323 337/123 |

(Continued)

*Primary Examiner* — Jacob R Crum
(74) *Attorney, Agent, or Firm* — Lin & Associates Intellectual Property, Inc.

(57) ABSTRACT

The present invention provides a relay with a shape memory alloy (SMA) wire driven mechanism. Conventional mechanical relays rely on electromagnetic principle to operate. Hence, magnetic fields of electromagnetic relays often interfere with magnetic fields of other electrical components, thus resulting in the components physically interfering with each other. The present invention utilizes the shape memory characteristics of a SMA wire to achieve the purpose of changing the operation of the relay. Specifically, when a SMA wire is heated, it restores to its original shape or original length. Comparing to conventional mechanical relays, the relay provided by the present invention does not magnetically interfere with other electrical components, and thus is able to function effectively. In addition, because the relay of the present invention does not require iron cores or coils, available space therein is increased and may be used to accommodate control circuits with various functions.

11 Claims, 10 Drawing Sheets

(56) References Cited

U.S. PATENT DOCUMENTS

| | | | | |
|---|---|---|---|---|
| 6,917,276 B1* | 7/2005 | Menard | ................... | F03G 7/065 |
| | | | | 337/14 |
| 2008/0139009 A1* | 6/2008 | Suzuki | ................ | G01R 1/0416 |
| | | | | 439/63 |
| 2012/0169451 A1* | 7/2012 | Mooney | ............... | H01H 71/145 |
| | | | | 337/382 |
| 2015/0116186 A1* | 4/2015 | Huang | .................... | H01Q 1/22 |
| | | | | 343/906 |

\* cited by examiner

RELAY WITH SMA WIRE DRIVEN MECHANISM

BACKGROUND OF THE INVENTION

1. Field of the Invention

The present invention relates to a relay; more particularly, relates to a relay that depends on shape memory alloy (SMA) wires to change operation status.

2. The Prior Arts

Relays are a type of electrical control devices which are often implemented in automatic control circuits. A relay is capable of switching between two statuses, so a contact of a contact system may be switched between a connected and a disconnected position. Such a relay may be considered as an automatic switch or a control switch, and may be broadly applied in various devices among fields of power reservation, automation, remote control, measurement and communication.

According to its operation principle, relays may be categorized into mechanical relays and solid state relays. Typically, a mechanical relay usually consists of elements such as an iron core, a coil, an armature and a reed. By applying certain voltage at the two ends of a coil, certain amount of electric current will flow through the coil, thereby creating electromagnetic effect. Consequently, the armature is attracted toward the iron core by the electromagnetic force against the tension of a spring. In turn, a movable contact is moved and is engaged with a fixed contact (a normally closed contact). Once the coil is cut off from electricity, the attraction provided by the electromagnetic force also disappears. As a result, the armature returns to its original position due to the reaction force of the spring, and the movable contact is released from the fixed contact (the normally closed contact) and is engaged with another fixed contact (a normally open contact). Through the process of engaging and releasing, such a relay may achieve the purpose of conducting or cutting off electricity in a circuit. Herein, the "normally open" and "normally closed" contacts may be defined as the following: a "normally open contact" refers to a fixed contact that is disconnected when no electricity is provided to the coil of the relay, and, a "normally closed contact" refers to a fixed contact that is connected.

SUMMARY OF THE INVENTION

Nonetheless, mechanical relays are usually installed in various control circuits of various devices along with a large amount of other electrical components. Many of these electrical components also rely on electromagnetic principle to operate. Hence, magnetic fields of electromagnetic relays often interfere with magnetic fields of other electrical components, thus resulting in the components physically interfering with each other. In addition, essential elements such as iron cores and coils, which take up a certain volume in mechanical relays, not only refrain the size of mechanical relays from miniaturization, the number of components which mechanical relays is able to accommodate is also limited. Therefore, conventional mechanical relays may only be used as simple switches.

Based on the above reasons, the present invention provides a mechanical relay that does not rely on electromagnetic principle to switch contacts. Instead, the present invention utilizes the shape memory characteristics of a shape memory alloy (SMA) wire to achieve the purpose of switching contacts and changing the operation of the relay. Specifically, when a SMA wire is heated, it restores to its original shape or original length. For example, when electricity is applied to a SMA wire, the SMA wire is heated and deforms. Comparing to conventional mechanical relays that generate magnetic fields with coils, the relay of the present invention does not magnetically interfere with other electrical components. Furthermore, because the relay of the present invention does not require iron cores or coils, available space therein is increased and may be used to accommodate processing chips, wireless transceiver modules or control circuits. In such a way, the user may be able to control the operation of the relay wirelessly, and further control the operation of its apparatus or equipment. Alternatively, the user may also be able to record and acquire the operation status of the relay.

In particular, two ends of the SMA wire of the present invention are secured at a circuit board. In addition to its own function, the circuit board also serves as a mechanical part that secures the two ends of the SMA wire. More particularly, the circuit board may be configured to or to not to provide electricity to the SMA wire, thereby directly controlling if the SMA wire should deform. Comparing to conventional relays, the size or thickness of the SMA wire in combination with the circuit board is way smaller than the size or thickness of the iron core combined with the coil. With the appropriate configuration provided by the present invention, the circuit board is able to provide the function of a circuit and also able to serve as the securing part of the SMA wire at the same time. The structure of the relay of the present invention is extremely simplified, thus is capable of accommodating more electrical circuits or electrical components.

Due to the above reasons, components such as wireless transceiver modules and integrated circuits may be provided on the circuit board of the relay in the present invention. Herein, integrated circuits may be a micro-processor or a control chip. As a result, the relay may receive external control commands via the micro-processor or the control chip for controlling the operation statuses of the relay; or, the operation statuses or information of the relay may be recorded and transmitted to external devices for data analysis or information compilation.

DETAILED DESCRIPTION OF THE PREFERRED EMBODIMENT

The accompanying drawings are included to provide a further understanding of the invention, and are incorporated in and constitute a part of this specification.

Figure 1A:
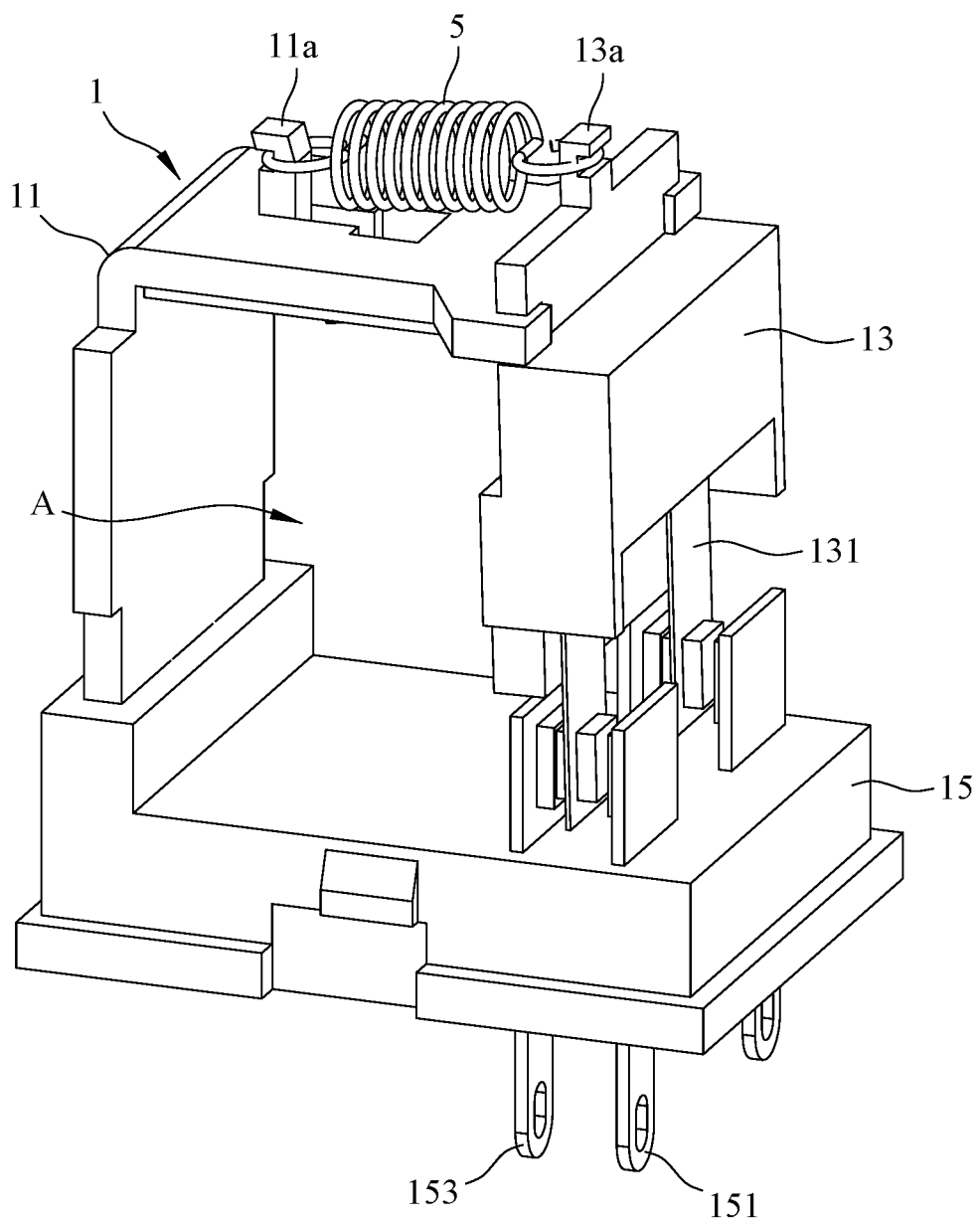
FIG. 1a is a perspective view illustrating a first embodiment of the present invention.
Figure 2:
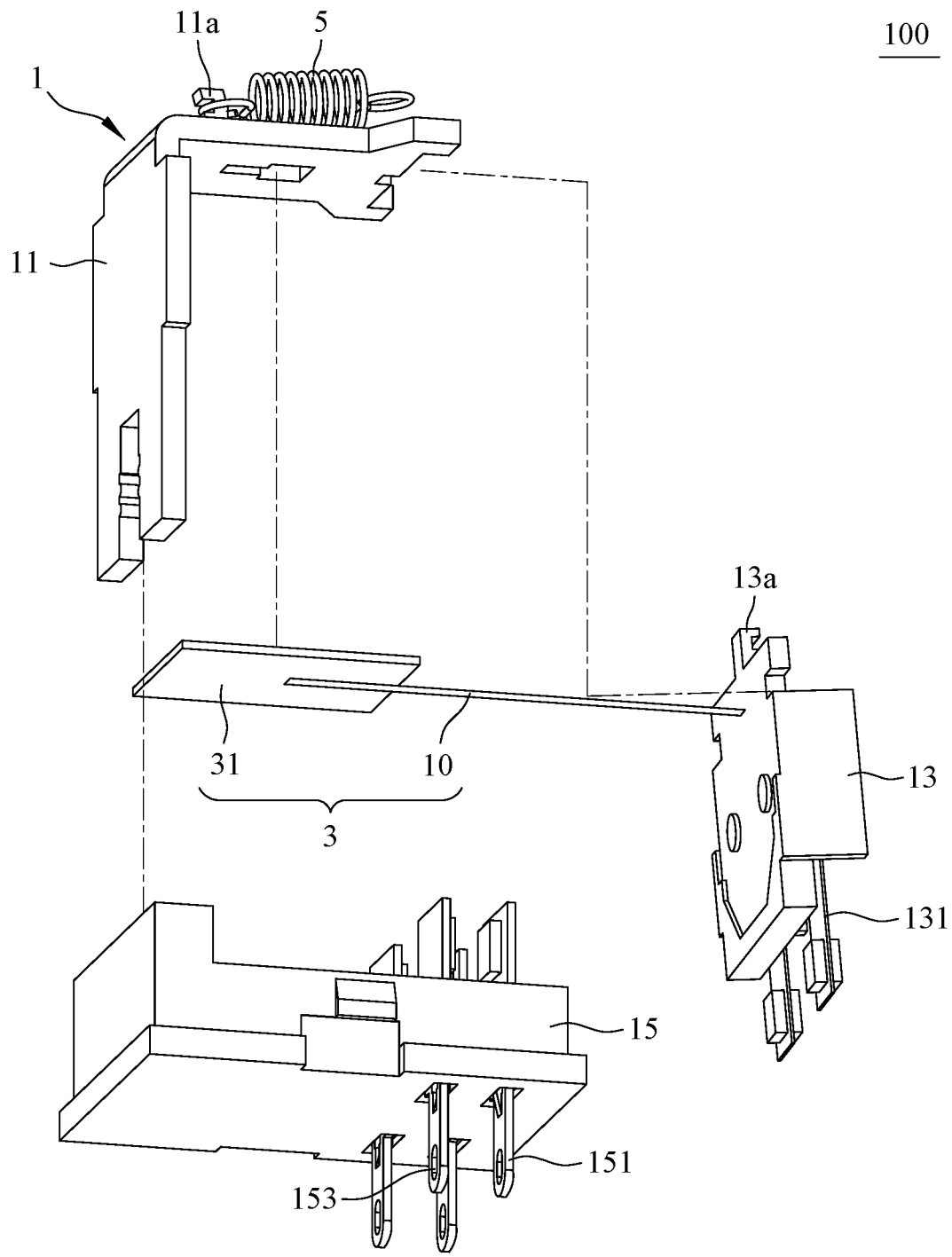
FIG. 2 is an exploded and perspective view illustrating the first embodiment of the present invention.

Referring to FIG. 1a, FIG. 1a is a perspective view illustrating a first embodiment of the present invention. Referring to FIG. 2, FIG. 2 is a perspective and exploded view illustrating the first embodiment of the present invention. As shown in FIGS. 1a and 2, a relay 100 with a SMA wire driven mechanism at least includes a main body 1 and a SMA wire driven mechanism 3. It should be noted that only components related to the present invention are shown in the figures. For the purpose of clarity, other components that are well known are not shown. In other words, the relay assuredly includes conductive structure of an external power source, a housing and other components, but the omission of these components should not have any impact on the following description of the present invention.

The main body 1 includes an accommodating space A. In the present invention, the accommodating space A does not accommodate any coils therein. The accommodating space A is at least formed by a securing member 11, a movable member 13 and a base 15 that encompass the accommodating space A. Preferably, the securing member 11 is a securing frame having an L-shape or a U-shape. In other words, any securing structure with a vertical portion and/or a horizontal portion is within the scope of the present invention. The shape of the securing frame is not limited to an L-shape or a U-shape. As long as the two portions are relatively vertical or relatively horizontal, the vertical portion and the horizontal portion do not need to be absolute vertical or horizontal. The movable member 13 may be a plate member or a sheet member. The base 15 is a seat body made of insulating or non-conducting materials. In the regard of relative positions, the securing member 11 is located above, in front of, at the left side of, at the right side of or at a rear side of the accommodating space A. The movable member 13 is in front of, at the left side of, at the right side of or at the rear side of the accommodating space A. The movable member 13 is further disposed at an opposite side from the securing member. That is, the securing member 11 and the movable member 13 are disposed at opposite sides of the accommodating space A, or, they can be located at adjacent sides of each other as well. The base 15 is located below the accommodating space A. The accommodating space A may be a closed space or a partially open space.

A top side of the movable member 13 is movably disposed at the securing member 11. For example, the top side of the movable member may be swingably or hangingly attached to the securing member 11. A bottom side of the movable member 13 is suspended and located above the base 15. Two conductive pieces 131 are disposed at the movable member 13. Herein, one end of each of the two conductive pieces 131 is connected to a power source (not shown in the figures). A pair of normally open securing terminal 151 and a pair of normally closed securing terminal 153 are disposed at the base 15. The other end of each of the two conductive pieces 131 is respectively located between the pair of normally open securing terminals 151 and the pair of normally closed securing terminals 153. The two conductive pieces 131, the pair of normally open securing terminals 151 and the pair of normally closed securing terminals 153 are electrically conductive.

Because of the above configurations, the top side of the movable member 13 may serve as a pivot point of the movable member 13, so that the bottom side of the movable member 13 may swing in a certain degree. For example, the movable member 13 may swing toward or away from the accommodating space A. More importantly, the two conductive pieces 131 may swing toward the pair of normally open securing terminals 151 and toward the pair of normally closed securing terminals 153 to form actual contacts therewith.

Preferably, a portion of each of the two conductive pieces 131 are inserted or embedded into the movable member 13. Another portion of each of the two conductive pieces 131 are located outside of the bottom portion of the movable member 13, and are located between the pair of normally open securing terminals 151 and the pair of normally closed securing terminals 153. Contacts 155 may be further disposed on the pair of normally open securing terminals 151 and the pair of normally closed securing terminals 153 at its opposing sides.

As shown in FIG. 2, the SMA wire driven mechanism 3 is disposed in the accommodating space A. The SMA wire driven mechanism 3 mainly includes a circuit board 31 and a SMA wire 10. The SMA wire 10 is connected between the circuit board 31 and the movable member 13. For example, as shown in FIG. 2, an end of the SMA wire is secured at the circuit board 31 via various securing methods such as welding, press bonding, gluing or clamping. The other end of the SMA wire 10 may be secured at the movable member 13 via various securing methods such as welding, press bonding, gluing or clamping. The SMA wire 10 may be a straight line, and the two ends of the SMA wire 10 may be electrically connected to the positive and negative electrodes of the power source in a direct or indirect manner.

When the SMA wire 10 is heated, for example but not limited to, when electricity is applied to and thus heats up the SMA wire 10, the SMA wire 10 shrinks and deforms. Because the portion of the movable member 13 that is hangingly attached to the securing member serves as the pivot point as the movable member 13 swings, and also because the SMA wire 10 is located inside the accommodating space A, the bottom side of the movable member 13 would swing toward the main body 1 when the SMA wire 10 shrinks. Consequently, the two conductive pieces 131 disposed at the bottom side of the movable member 13 are moved toward and abutted against the pair of normally closed securing terminals 153 (depending on actual demands, the two conductive pieces 131 may also be configured to abut against the pair of normally open securing terminals 151) to form electrical contact therebetween, as shown in FIG. 1a. When the SMA wire 10 is not heated, the two conductive pieces 131 would be released from the pair of normally closed securing terminals 153 (depending on actual demands, the two conductive pieces 131 may also be configured to leave the pair of normally open securing terminals 151).

Figure 3A:
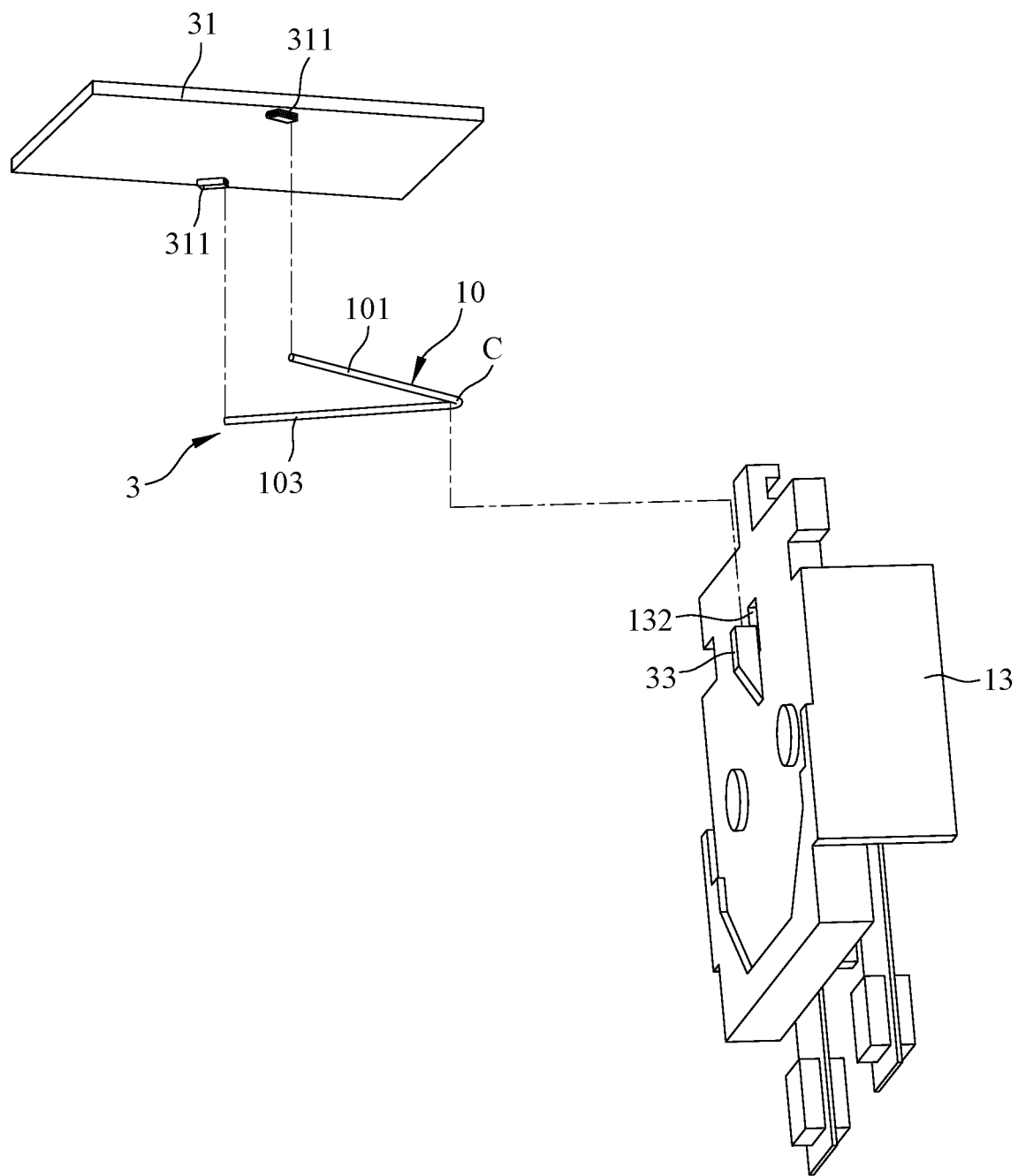
FIG. 3a is an exploded and perspective view illustrating a first SMA wire driven mechanism of a preferred embodiment of the present invention.

Referring to FIG. 3a, FIG. 3a is an exploded and perspective view illustrating the SMA wire driven mechanism according to a preferred embodiment of the present invention. As shown in FIG. 3a, the SMA wire driven mechanism 3 further includes two securing portions 311 and a wire mounting portion 33. The circuit board 31 is directly or is indirectly fixed to the securing member 11 and is located inside the accommodating space A. The two securing portions 311 are disposed on a surface of the circuit board 31 or are disposed at a side of the movable member 13. The wire mounting portion 33 is disposed on the movable member 13 or the circuit board 31 at a position that corresponds to the positions of the two securing portions 311. A portion of the SMA wire 10 is wrapped around the wire mounting portion 33 and the two ends of the SMA wire 10 are secured in the two securing portions 311.

As shown in FIG. 3a, when the two securing portions 311 are disposed on the circuit board 31, the wire mounting portion 33 is disposed on the movable member 13. Contrarily, when the two securing portions 311 are disposed on the movable member 13, the wire mounting portion 33 is disposed on the circuit board 31. Preferably, when the two securing portions 311 are disposed on the circuit board 31, the two securing portions 311 may be provided as conductive portions that are formed on the circuit board 31, or may be provided as securing members that are mounted on the conductive portions of the circuit board 31. If the securing portions 311 are configured to be the conductive portions, the two ends of the SMA wire 10 may be directly welded to the conductive portions. For example, conductive portions may be conductive pads, conductive circuits, or, other conductive components or elements. If the securing portions 311 are configured to be the securing members, the two ends of the SMA wire 10 are secured in the securing members. The securing members may be provided as various permanent securing members, such as a screw type, a glue type or a press-fit securing member. Herein, the SMA wire 10 may be electrically connected to the positive and negative electrodes of the power source in a direct manner. Alternatively, the SMA wire 10 may be electrically connected to the positive and negative electrodes of the power source via the two securing portions or via a conductive circuit of the circuit board.

Figure 3B:
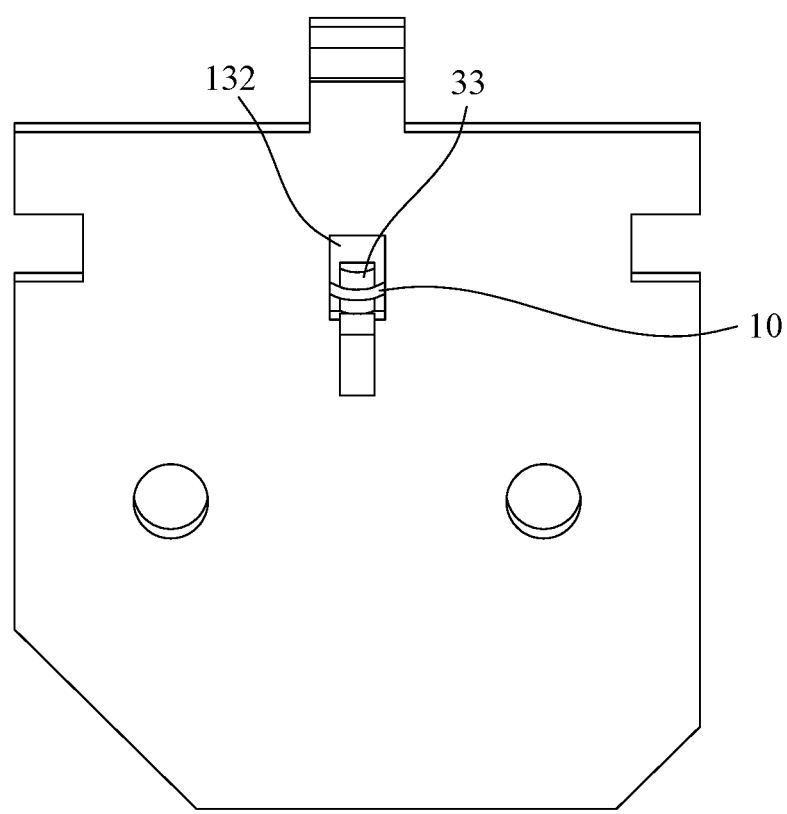
FIG. 3b is a schematic view illustrating an opening and a post of the present invention.

The wire mounting portion 33 may be a post, for example, and may be disposed at a side of the circuit board 31 or at a side of the movable member 13. When the post is disposed at a side surface of the movable member 13 as an independent member, the post is connected to the movable member 33 via a connecting rod (not shown in the figures). In such a way, a space is provided between the post and the side surface of the movable member 13 for the SMA wire 10 to pass through. Herein, the post is substantially parallel to the movable member 13. Alternatively, the wire mounting portion 33 may be a through hole or a notch. For instance, the wire mounting portion 33 may be a through hole 10 that penetrates in a direction that is vertical to the circuit board 31 for the SMA wire to pass through. The notch may be formed at an edge of the circuit board 31, for example, at a side of the circuit board 31 that is away from the movable member. In such a way, the SMA wire 10 may be configured around the notch, and the notch may serve as a pivot point of the SMA wire 10. Alternatively, the wire mounting portion 33 may be an opening 132 having a post. In this embodiment, the post is disposed inside the opening or at an outer side of the opening. For instance, the opening may be formed on the movable member 13, and the post may be provided in the opening or outside of the opening, as shown in FIG. 3b. As a result, the SMA wire 10 may be put into the opening, wrapped around the post and then exit the opening.

Herein, the circuit board 31 may be but not limited to a single-sided circuit board or a double-sided circuit board. When the circuit board 31 is a single-sided circuit board, the surface of the circuit board 31 that has no circuits is fixed to the securing member 11. When the securing member 11 is an L-shaped securing frame, the surface of the circuit board 31 that has no circuits is abutted against and is directly mounted to the horizontal segment of the L-shaped frame. The surface of the circuit board 31 that has circuits is exposed in the accommodating space A. The two securing portions 311 are disposed at the surface of the circuit board 31 that is exposed in the accommodating space A.

When the wire mounting portion 33 is provided as a post, the post may be an independent member and may be mounted on the movable member 13. Alternatively, the post may be integrally formed with the movable member 13 via appropriate manufacturing processes such as deduction or impact molding.

As shown in FIG. 3a, the SMA wire 10 is configured around the wire mounting portion 33, and the two ends of the SMA wire 10 are secured at the two securing portions 311. The SMA wire 10 at least includes a bent portion C. The bent portion C is located between the two ends of the SMA wire 10. Preferably, the bent portion C is located in the middle or at the center of the SMA wire 10. Two segments 101, 103 of the SMA wire 10 that are located at two sides of the bent portion C at least partially correspond with each other. Preferably, the two segments of the SMA wire 10 that are located at two sides of the bent portion C are symmetrically provided as two symmetrical segments. For example, the SMA wire 10 may have a V shape or a shape with similar characteristics. Preferably, the two symmetrical segments 101, 103 are straight lines, and the lengths of the two symmetrical segments 101, 103 are substantially the same. The bent portion C may be formed by configuring the middle portion of the SMA wire 10 around the wire mounting portion 33. Preferably, the bent portion C and a side of the wire mounting portion 33 of which the SMA wire is wrapped around both have an arced shape. In other words, a portion of the post is formed as an arced shape, as shown in FIG. 3b.

Figure 1B:
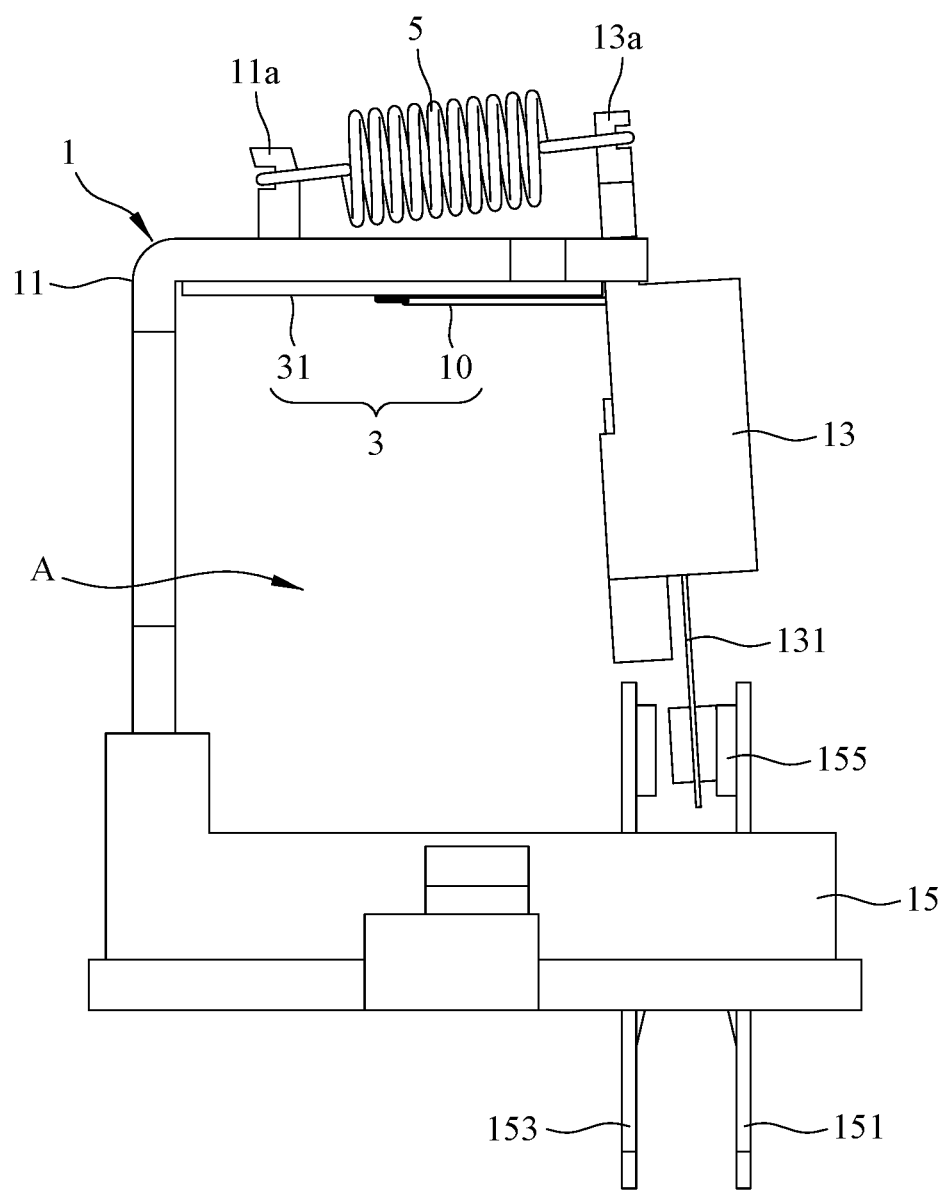
FIG. 1b is a side view illustrating the first embodiment of the present invention, wherein conductive pieces are abutted against normally open securing terminals.

As shown in FIG. 1a, the relay of the present invention further includes an elastic member 5. The elastic member 5 is connected between the securing member 11 and the movable member 13. The position of the elastic member 5 is configured with respect to the SMA wire driven mechanism 3. Therefore, in the current embodiment, the elastic member 5 is located outside of the accommodating space A, for example, the elastic member 5 is located above the securing member 11 and the movable member 13, as shown in FIG. 1. Two mounting base 11a, 13a are respectively disposed on the securing member 11 and the movable member 13. The elastic member 5 is horizontally disposed, and the two ends of the elastic member 5 are respectively connected to the two mounting bases 11a, 13a. At this time, due to the tension of the elastic member 5, the top side of the movable member 13 is moved toward the main body 1. Meanwhile, the bottom side of the movable member 13, where the two conductive pieces 131 are disposed at, is moved toward the pair of normally open securing terminals. As a result, the two conductive pieces 131 are abutted against the normally open securing terminals to form electrical contacts therebetween, as shown in FIG. 1b.

When the SMA wire 10 is heated, for example, when electricity is applied thereto and thus heats up the SMA wire 10, the SMA wire 10 shrinks and deforms against the tension of the elastic member 5. Hence, the top side of the movable member 13 is moved away from the main body 1. The bottom side of the movable member 13, where the two conductive pieces 131 are disposed at, are moved toward the pair of normally closed securing terminals. In such a way, the two conductive pieces 131 are abutted against the normally closed securing terminals to form electrical contacts therebetween, as shown in FIG. 1a. When the SMA wire 10 is not heated, for example, when electricity is cut off and the temperature of the SMA wire 10 drops, the two conductive pieces 131 will return to its original position due to the elastic restoring force of the elastic member 5. Specifically, the two conductive pieces 131 will return to the position where they are abutted against the pair of normally open securing terminals, and the two conductive pieces 131 will stay in such a condition which they are abutted against the pair of normally open securing terminals.

Preferably, the elastic member 5 and the SMA wire driven mechanism 3 are respectively disposed at an upper side and a lower side of the portion of the movable member which serves as the pivot of the swinging motion, or, the elastic member 5 and the SMA wire driven mechanism 3 are respectively disposed at a lower side and an upper side of the pivot portion of the movable member. For example, the elastic member 5 and the SMA wire driven mechanism 3 may be respectively located at an upper side or a lower side of the hangingly attached portion of the movable member 13. In such a way, the two conductive pieces 131 of the movable member 13 may swing toward its predetermined direction by the SMA wire driven mechanism 3 and the elastic member 5 in a more efficient manner.

Figure 4:
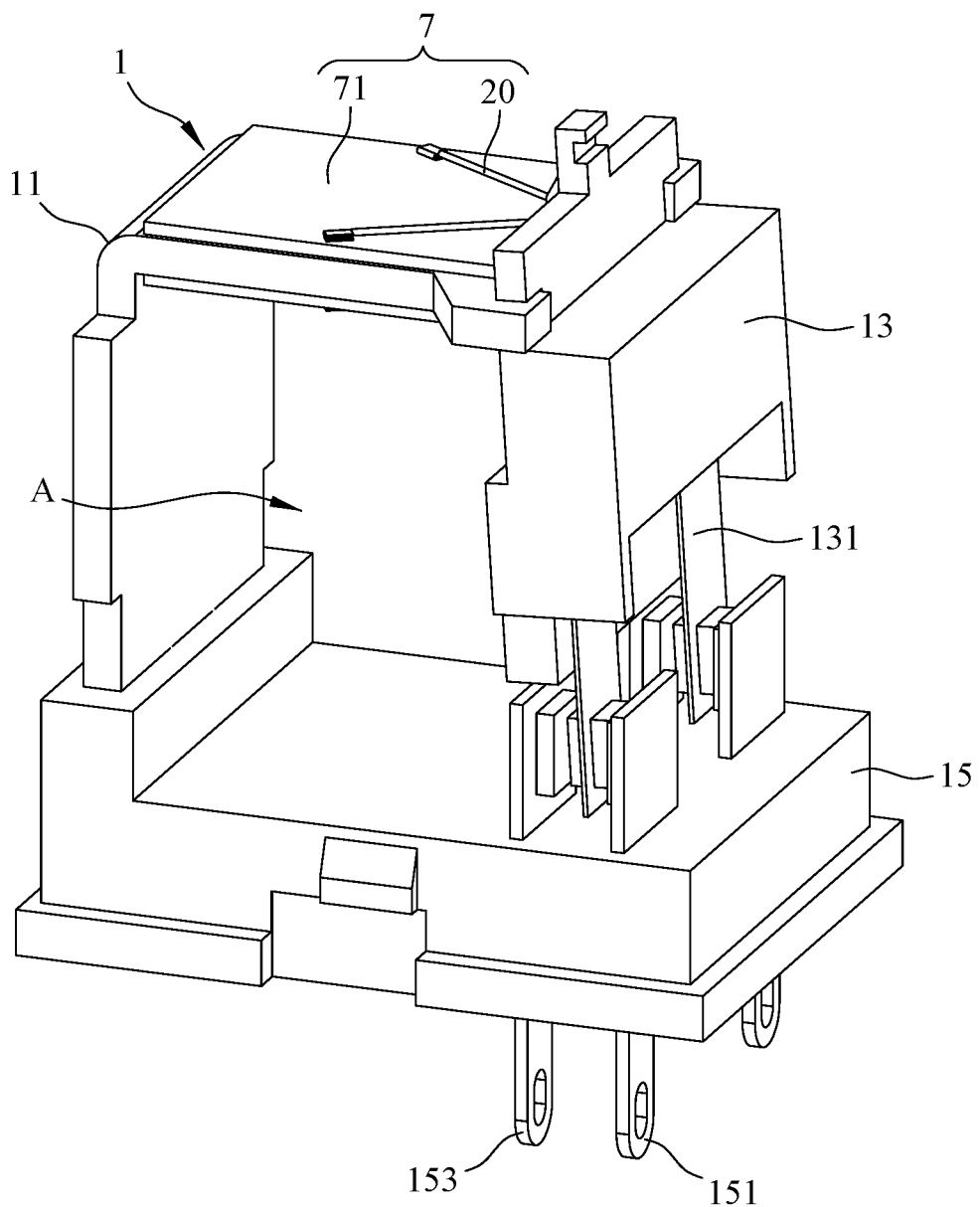
FIG. 4 is a perspective view illustrating a first preferred embodiment of the present invention.

Referring to FIG. 4, FIG. 4 is a perspective view illustrating a first preferred embodiment of the present invention. As shown in FIG. 4, the relay of the present invention further comprises another SMA wire driven mechanism 7. The location of the SMA wire driven mechanism 7 is decided based on the location of the SMA wire driven mechanism 3; hence, the SMA wire driven mechanism may also be disposed inside or outside the accommodating space A. The SMA wire driven mechanism 7 is completely the same as the SMA wire driven mechanism 3. Specifically, the SMA wire driven mechanism 7 includes a circuit board 71 and a SMA wire 20. Additionally, the SMA wire driven mechanism 7 also includes a wire mounting portion and two securing portions. The specific structures, locations and relative positions of the circuit board 71, SMA wire 20, wire mounting portions and two securing portions of the SMA wire driven mechanism 7 is the same as those of the SMA wire driven mechanism 3. Hence, please refer to the above section for the description of the SMA wire driven mechanism 3. Since the two SME wire driven mechanism are completely the same, the specifics description regarding the SMA wire driven mechanism 7 will be omitted hereafter.

Preferably, the wire mounting portions of the SMA wire driven mechanisms 3, 7 are disposed at corresponding locations. Alternatively, the size and location of the wire mounting portion 33 may be configured such that the SMA wire driven mechanisms 3, 7 share a single wire mounting portion 33. In such a way, there is no need to provide two wire mounting portions. The number of the wire mounting portions or how the wire mounting portions are provided may be decided based on actual needs of the design and are not limited to the above embodiments. The circuit board 31 of the SMA wire driven mechanism 3 and the second circuit board 71 of the SMA wire driven mechanism 7 may be respectively provided at a bottom side and a top side of the horizontal portion of the securing member 13. Ideally, the two SMA wire driven mechanisms 3, 7 are provided on the securing member 13 in a mirrored manner around the horizontal portion thereof.

The purpose of the SMA wire driven mechanism 7 is the same as the elastic member 5. When the SMA wire driven mechanism is heated, for example, when electricity is provided to the SMA wire 20 and the SMA wire 20 is heated up, the SMA wire 20 would shrink and deform. Consequently, the two conductive pieces 131 are moved toward the pair of normally open securing terminals simultaneously, thereby abutting against the pair of normally open securing terminals to form electrical contacts therebetween, as shown in FIG. 4.

Figure 5:
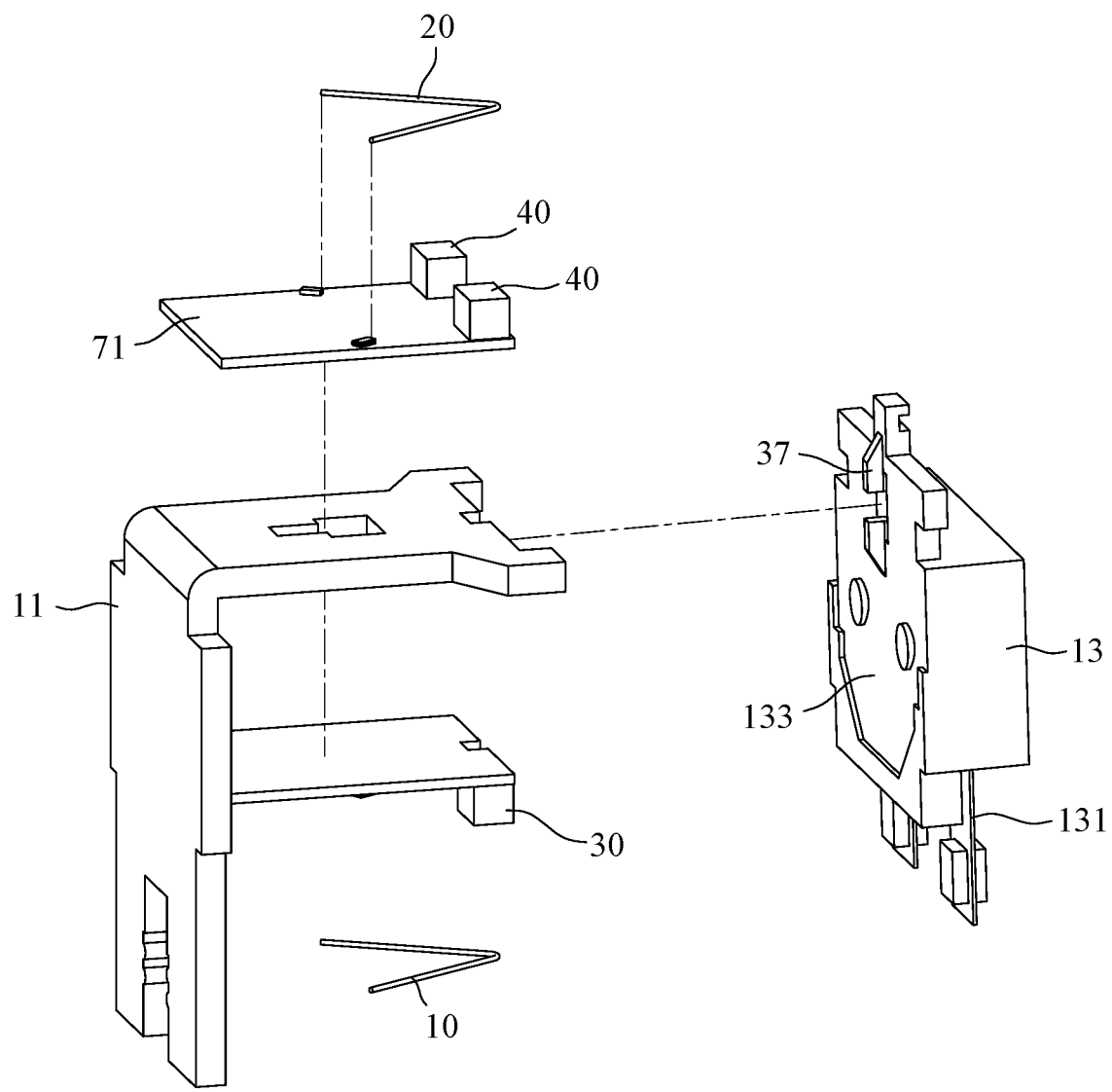
FIG. 5 is an exploded and perspective view illustrating a second preferred embodiment of the present invention.

Referring to FIG. 5, FIG. 5 is an exploded and perspective view illustrating a second preferred embodiment of the present invention. As shown in FIG. 5, the relay of the present invention further includes one or more attracting elements. In this embodiment of the present invention, two pairs of attracting elements 30, 40 are provided. Notably, the number of the attracting elements may be decided based on the actual needs of the design. The embodiments in the present invention are for illustrative purposes only and are not to limit the scope of the present invention.

Figure 6A:
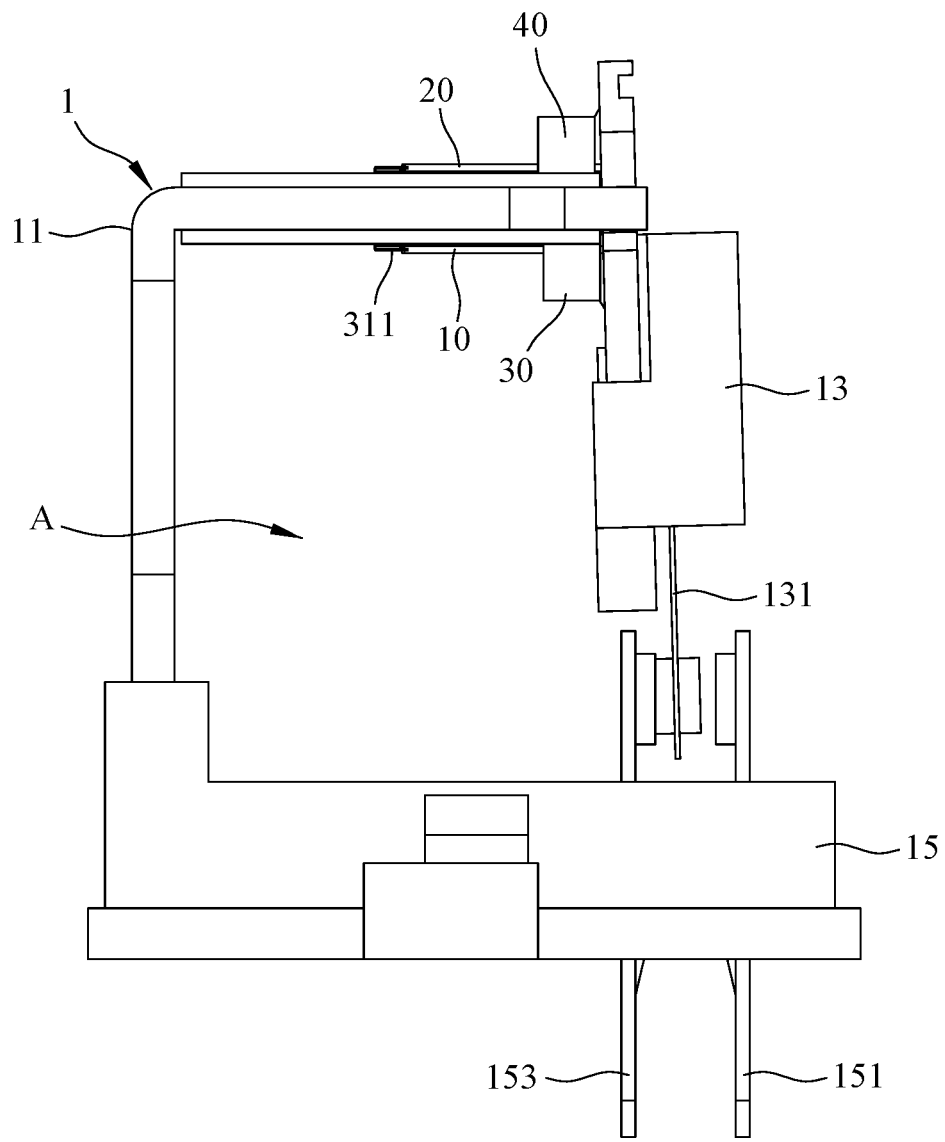
FIG. 6a is a side view illustrating the conductive pieces being abutted against the normally closed securing terminals according to the second preferred embodiment.
Figure 6B:
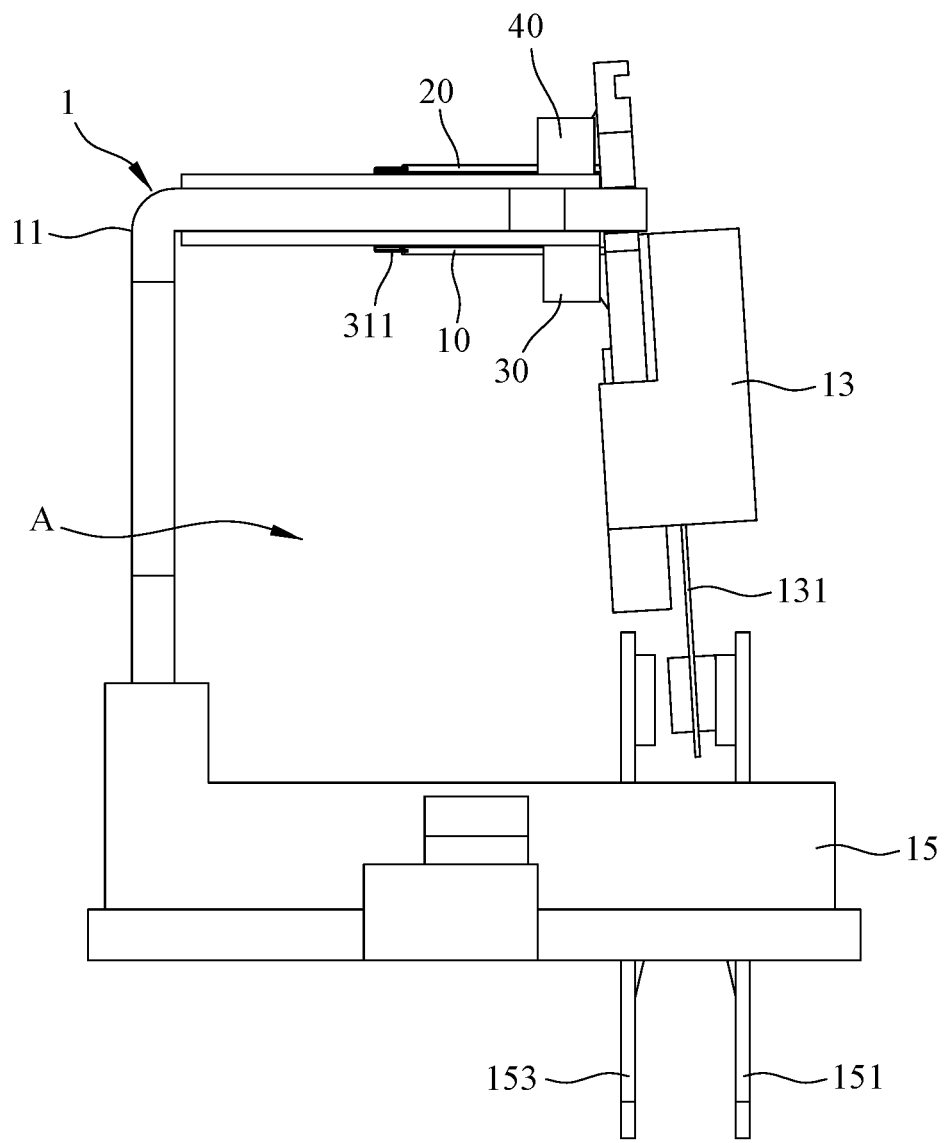
FIG. 6b is a side view illustrating the conductive pieces being abutted against the normally open securing terminals according to the second preferred embodiment.

One pair of the attracting elements 30 is provided on the circuit board 31 at a location proximal to the movable member 13. Another pair of the attracting elements 40 is provided on the circuit board 71 at a location proximal to the movable member 13. The movable member 13 further includes a metal sheet 133. The metal sheet 133 is disposed at an inner side of the movable member 13. When the SMA wire 10 or the SMA wire 20 is heated and deforms, the metal sheet 133, which is located at the inner side of the movable member 13, is moved toward the attracting elements 30, 40. Then, the metal sheet 133 is attracted and positioned by the attracting elements 30, 40 respectively, as shown in FIGS. 6a and 6b. In such a way, the SMA wire 10 or the SMA wire 20 may be attracted and positioned by the attracting elements 30, 40 without any electricity being provided thereto and without being heated continuously. Consequently, the SMA wire 10 or the SMA wire 20 may be kept in substantial electrical contact with the pair of normally open securing terminal or the pair of normally closed securing terminal, thereby reducing the consumption of electrical energy.

Preferably, the attracting elements 30, 40 are provided as magnets, and the metal sheet 133 are chosen from materials that may be attracted by magnets.

Figure 7:
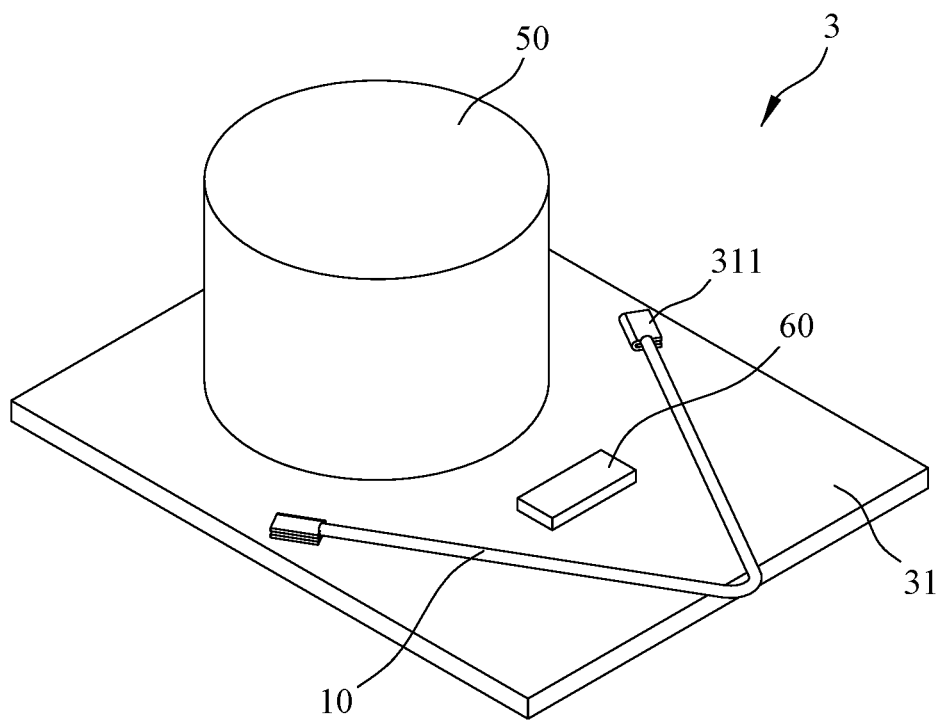
FIG. 7 is a schematic view illustrating a wireless transceiver module and an integrated circuit being disposed on a circuit board of the present invention.

Referring to FIG. 7, FIG. 7 is a schematic view illustrating a wireless transceiver module and an integrated circuit being disposed on a circuit board of the present invention. The circuit board 31 and/or the circuit board 71 described above may further include a wireless transceiver module 50 and an integrated circuit 60. Control signals may be sent to the wireless transceiver module 50 and the integrated circuit 60 via wireless communication, so the relay may be operated based on the control signals. Hence, when a conventional relay is replaced by the relay of the present invention, a user may directly control the operation of the components of the equipment. With the relay provided by the present invention, a user may gain direct control of specific components of the equipment via the wireless transceiver module in a much efficient manner without having to alternate any internal circuits of the equipment. In addition, the integrated circuit of the relay allows the user to access various operation information of the relay, and further allows the user to transmit such information to various devices with information storing functions via the wireless transceiver module 50. Various applications may be implemented based on the operation information of the relay. For example, a user may monitor the operation information of the components of the equipment. In addition, the user may further analyze, generate and compile information via statistical application software based on accumulated data.

The wireless transceiver module 50 may be one of a Bluetooth module, a Wi-Fi communication module, a ZigBee module or a Radio Frequency Identification communication module.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A relay with shape memory alloy (SMA) wire driven mechanism, comprising:
   a main body having an accommodating space, wherein the accommodating space does not accommodate any coils therein and is at least formed by a securing member, a movable member and a base that encompass the accommodating space, wherein a top side of the movable member is movably disposed at the securing member, a bottom side of the movable member is suspended above the base, two conductive pieces are disposed at the movable member, an end of each of the two conductive pieces is connected with a power source, a pair of normally open securing terminals and a pair of normally closed securing terminals are disposed on the base, and another end of each of the two conductive pieces is respectively located between the pair of normally open securing terminals and the pair of normally closed securing terminals; and
   the SMA wire driven mechanism disposed inside or outside the accommodating space, comprising:
   a circuit board mounted at the securing member; and
   a SMA wire connected between the circuit board and the movable member;
   wherein when the SMA wire is heated, the SMA wire shrinks and deforms, and consequently, the two conductive pieces are moved toward one of the pair of normally open securing terminals or the pair of normally closed securing terminals,
   wherein when the SMA wire is not heated, the two conductive pieces leave one of the pair of normally open securing terminals or the pair of normally closed securing terminals.

2. The relay with SMA wire driven mechanism according to claim 1, wherein an end of the SMA wire is secured at the circuit board and another end of the SMA wire is secured at the movable member.

3. The relay with SMA wire driven mechanism according to claim 1, further comprising two securing portions and a wire mounting portion, wherein the two securing portions are disposed at the circuit board or are disposed at a side of the movable member, and the wire mounting portion is disposed on the movable member or the circuit board at a position that corresponds to the positions of the two securing portions, wherein the SMA wire is wrapped around the wire mounting portion, and two ends of the SMA wire are secured at the two securing portions.

4. The relay with SMA wire driven mechanism according to claim 3, wherein the two securing portions are electrically connected to the SMA wire, wherein the two securing portions are configured as conductive portions of the circuit board, or are configured as securing members that are fixed to conductive portions of the circuit board.

5. The relay with SMA wire driven mechanism according to claim 3, wherein the wire mounting portion is a post being disposed on a surface of the circuit board or being disposed at a side surface of the movable member, and the post is connected to the movable member via a connecting rod; alternatively, the wire mounting portion is a through hole or a notch, wherein the through hole penetrates through the circuit board, or, the notch is formed at an edge of the circuit board; alternatively, the wire mounting portion is configured as an opening with a post, wherein the post is disposed in the opening or is disposed at an outer side of the opening.

6. The relay with SMA wire driven mechanism according to claim 3, wherein the SMA wire at least comprises a bent portion, the bent portion is located between the two ends of the SMA wire, and two segments of the SMA wire that are located at two sides of the bent portion at least partially correspond with each other.

7. The relay with SMA wire driven mechanism according to claim 1, wherein the bent portion and a side of the wire mounting portion of which the SMA is wrapped around both have an arced shape.

8. The relay with SMA wire driven mechanism according to claim 1, further comprising an elastic member, wherein the elastic member is connected between the securing member and the movable member, when the SMA wire is not heated, the two conductive pieces are moved toward one of the pair of normally open securing terminals and the pair of normally closed securing terminals via elasticity of the elastic member, and as a result, the two conductive pieces are abutted against one of the pair of normally open securing terminals and the pair of normally closed securing terminals to form electrical contact therebetween.

9. The relay with SMA wire driven mechanism according to claim 1, further comprising at least one or more attracting element, wherein the at least one or more attracting element is disposed on the circuit board at a position that is close to the movable member, and the movable member further comprises a metal sheet which is disposed at an inner side thereof, wherein when the SMA wire is in heat and deforms, the metal sheet which is located at the inner side of the movable member is moved toward the at least one or more attracting element, consequently, the metal sheet is attracted and positioned by the at least one or more attracting element.

10. The relay with SMA wire driven mechanism according to claim 1, wherein the attracting element is a magnet.

11. The relay with SMA wire driven mechanism according to claim 1, wherein the circuit board further comprises a wireless transceiver module and an integrated circuit.

* * * * *